United States Patent
Evans et al.

(10) Patent No.: US 10,449,617 B2
(45) Date of Patent: Oct. 22, 2019

(54) MULTIFUNCTION WIRE FEEDER FOR A PORTABLE WELDING SYSTEM

(71) Applicant: The ESAB Group, Inc., Florence, SC (US)

(72) Inventors: Daryll Scott Evans, Winchester, VA (US); Sean William Flickinger, Lakewood, CO (US)

(73) Assignee: The ESAB Group Inc., Florence, SC (US)

(*) Notice: Subject to any disclaimer, the term of this patent is extended or adjusted under 35 U.S.C. 154(b) by 902 days.

(21) Appl. No.: 14/933,224

(22) Filed: Nov. 5, 2015

(65) Prior Publication Data

US 2016/0129522 A1 May 12, 2016

Related U.S. Application Data

(60) Provisional application No. 62/076,750, filed on Nov. 7, 2014.

(51) Int. Cl.
*B23K 9/12* (2006.01)
*B23K 9/133* (2006.01)

(52) U.S. Cl.
CPC .............. *B23K 9/1336* (2013.01); *B23K 9/12* (2013.01); *B23K 9/133* (2013.01)

(58) Field of Classification Search
CPC ...... B23K 9/133; B23K 9/1336; B23K 9/124; B23K 26/211; B23K 9/12

(Continued)

(56) References Cited

U.S. PATENT DOCUMENTS 343,083 A 6/1886 Smith
5,225,657 A * 7/1993 Blankenship ............ H05H 1/34
219/121.39

(Continued)

FOREIGN PATENT DOCUMENTS

CN 103433596 A 12/2013
HU 222201 B1 5/2003

(Continued)

OTHER PUBLICATIONS

Notification of the First Office Action and Search Report for Chinese Counterpart Patent Application No. 201510751049.5, dated Nov. 26, 2018, 17 pages.

(Continued)

*Primary Examiner* — Tu B Hoang
*Assistant Examiner* — Tiffany T Tran
(74) *Attorney, Agent, or Firm* — Edell, Shapiro & Finnan, LLC

(57) ABSTRACT

A wire feeder including a housing having wire inlet and outlet regions. In some approaches, a tensioning assembly includes a pivotable tension arm and a pivotable tension knob assembly. The pivotable tension arm has a pivot axis oriented perpendicular to the direction of a wire fed through the wire feeder, while the pivotable tension knob assembly has a pivot axis oriented parallel to the direction of the wire fed through the wire feeder. A roller assembly includes a drive roller rotatably coupled to the pivotable tension arm, and a feed roller coupled to the housing. The feed roller is positionable opposite the drive roller to receive a welding wire therebetween and to move the welding wire from the wire inlet region to the wire outlet region. A gear assembly transmits rotational motion from a motor to the feed roller.

18 Claims, 17 Drawing Sheets

(58) Field of Classification Search
USPC .......... 219/136, 137.1, 137.2, 137.3, 137.31, 219/137.7
See application file for complete search history.

(56) References Cited

U.S. PATENT DOCUMENTS

| | | | |
|---|---|---|---|
| 5,816,466 | A | 10/1998 | Seufer |
| 6,286,748 | B1 | 9/2001 | Cooper |
| 6,388,234 | B1 | 5/2002 | Collins et al. |
| 6,427,894 | B1 | 8/2002 | Blank et al. |
| 6,568,578 | B1 * | 5/2003 | Kensrue ............... B23K 9/1336 219/137.7 |
| 7,026,574 | B2 | 4/2006 | Belfiore et al. |
| 7,383,973 | B2 | 6/2008 | Enyedy |
| 7,441,682 | B2 | 10/2008 | Kerekes et al. |
| 7,531,768 | B2 | 5/2009 | Matiash |
| 7,687,742 | B2 | 3/2010 | Belfiore et al. |
| 7,692,117 | B2 | 4/2010 | Belfiore et al. |
| 8,450,647 | B2 | 5/2013 | Leiteritz |
| 8,569,653 | B2 | 10/2013 | Enyedy |
| 8,575,517 | B2 | 11/2013 | Ertmer et al. |
| 8,783,084 | B2 | 7/2014 | Etienne |
| 2005/0040202 | A1 | 2/2005 | Kerekes et al. |
| 2008/0035624 | A1 * | 2/2008 | Ertmer ................. B23K 9/1336 219/137.7 |
| 2010/0072317 | A1 | 3/2010 | Cooper |
| 2012/0152924 | A1 | 6/2012 | Christopher |
| 2012/0248084 | A1 * | 10/2012 | Romenesko ......... B23K 9/1336 219/137.7 |
| 2014/0151350 | A1 | 6/2014 | Hemmert et al. |

FOREIGN PATENT DOCUMENTS

| | | |
|---|---|---|
| JP | S59-147778 A | 8/1984 |
| KR | 20140002117 U | 2/2005 |
| WO | 2003/022501 A2 | 3/2003 |
| WO | 2008/018961 A1 | 2/2008 |

OTHER PUBLICATIONS

Communication and extended European search report of European counterpart Application, Application No. 18168185.9-1016, dated Aug. 17, 2018, 7 pages.
Partial European Search Report dated May 16, 2016 for European Patent Application No. 15190229.3.

* cited by examiner

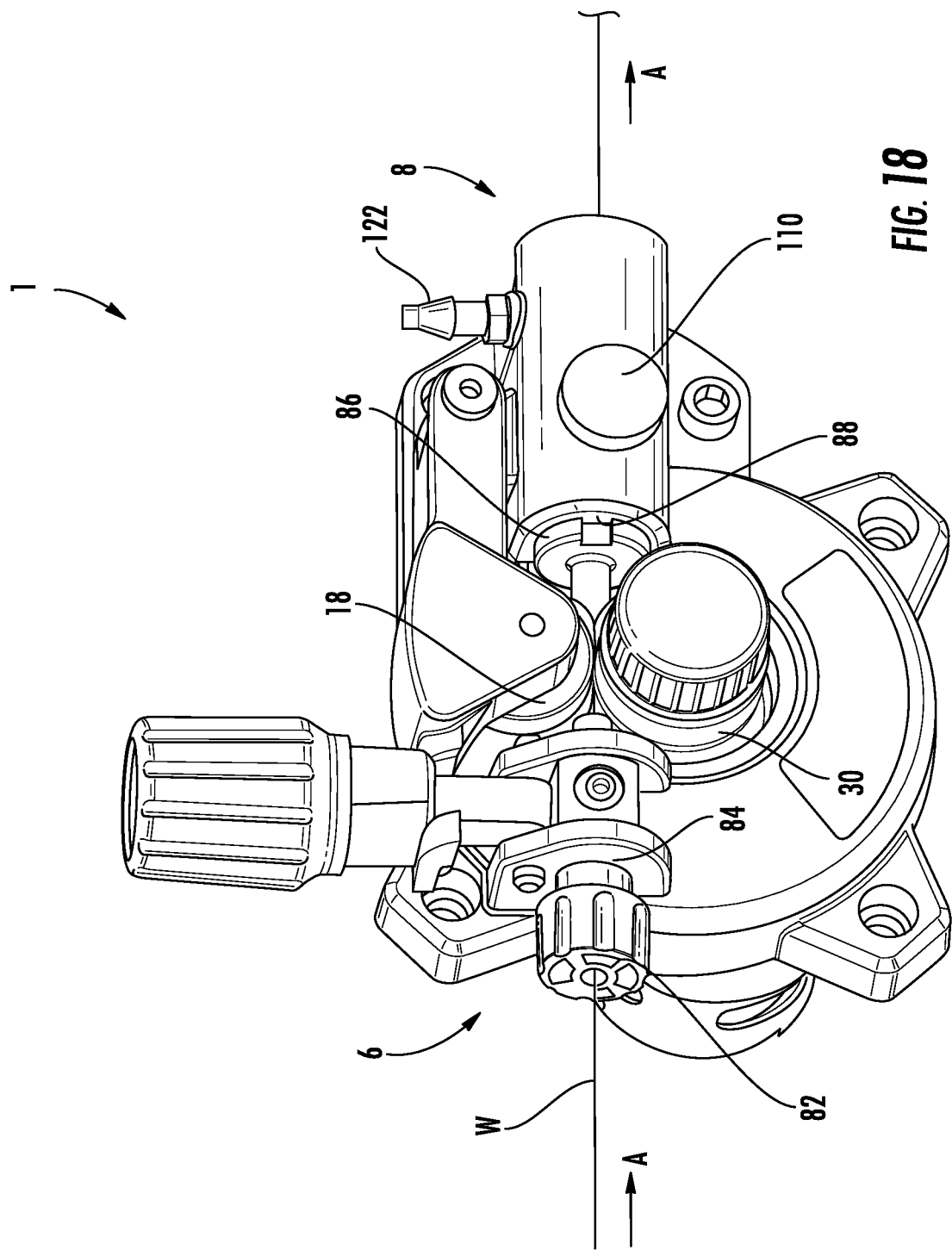

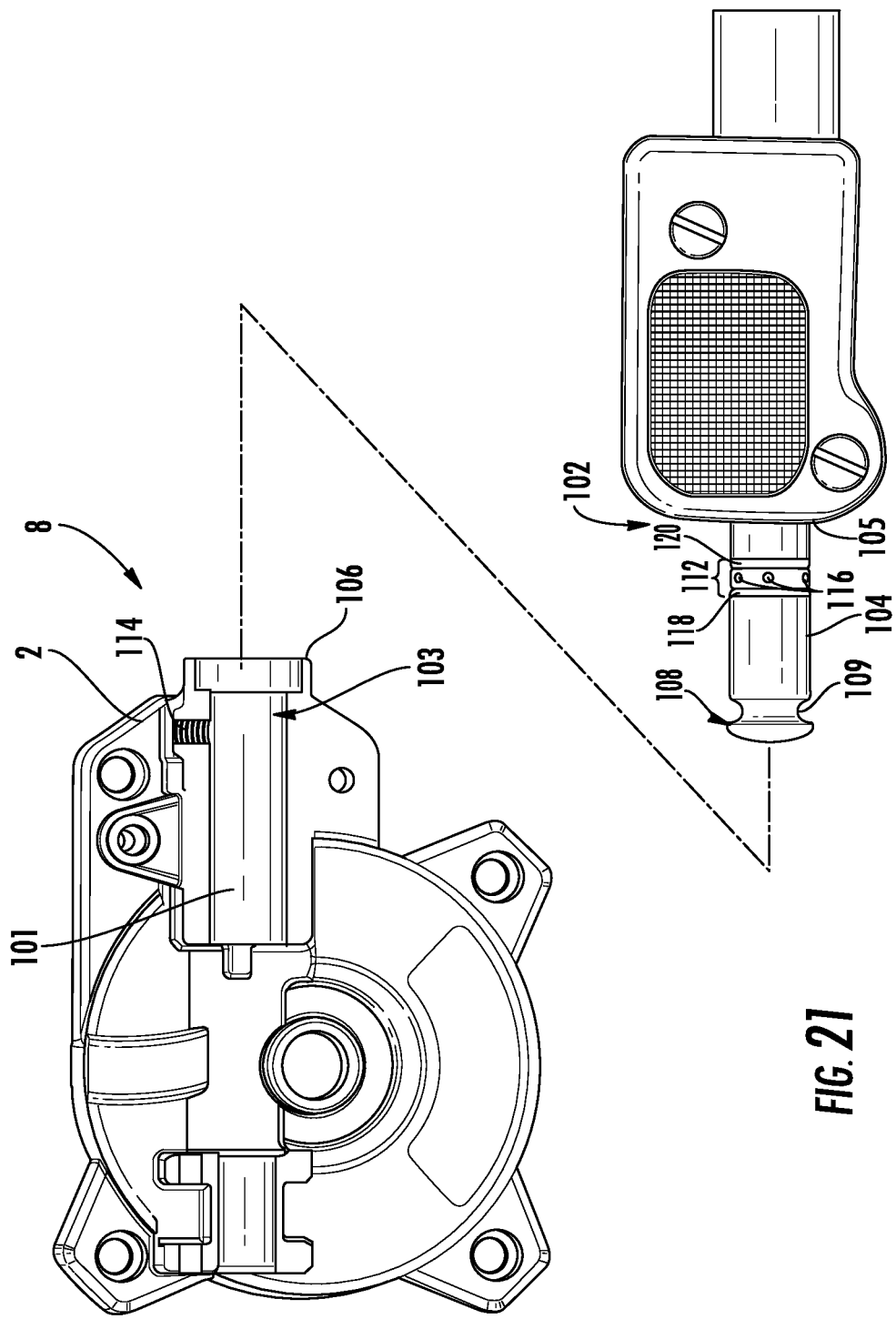

MULTIFUNCTION WIRE FEEDER FOR A PORTABLE WELDING SYSTEM

CROSS-REFERENCE TO RELATED APPLICATIONS

This application claims priority to U.S. provisional patent application Ser. No. 62/076,750, filed Nov. 7, 2014, the entire contents of which is incorporated by reference herein.

FIELD OF THE DISCLOSURE

The disclosure generally relates to arc welding equipment, and more particularly to an improved wire feeder for a portable arc welding system.

BACKGROUND OF THE DISCLOSURE

Gas metal arc welding has several advantages over other types of welding including high deposition rates, speed, excellent weld quality, minimal distortion of the work piece and no stub loss. Typically, a conventional metal inert gas (MIG) apparatus includes a torch and a wire electrode continuously fed from a supply reel or other source by an electrode wire feeder through the torch. An arc between the torch and the work piece continuously melts the wire electrode to form the weld puddle.

Heretofore, electrode wire feeders have included opposed feed rolls which exert a pressure on the electrode wire passing therebetween and are driven by meshing gears to feed the electrode wire to and through the torch. In some instances, a single pair of opposed feed rolls are used, while in other instances two pairs of feed rolls are utilized in spaced relation along the feed path of the wire.

During use, the electrode wire is threaded between the opposed feed rolls, and thus, provision must be made to form a gap therebetween for threading-up purposes and for closure of such a gap for operational purposes. Typically, one of the feed rolls of the pair or each of the pairs of feed rolls is mounted for movement between operative and inoperative positions to provide for formation and closure of such a gap.

One issue with existing wire feeders is that the manner in which the pair of feed rolls is released from the operative position involves the use of a clamping lever that is not conveniently operated because it can interfere with other internal components of the welding device. Another issue is that existing wire feeders are designed to receive a single set of drive reduction gears, thus limiting the wire feed speed to a single value or an undesirably narrow range of values. Yet another issue is that existing wire feeders are typically provided with a generic torch connection, which thus requires the provision of one or more separate adapters to connect to a particular style of torch.

SUMMARY OF THE DISCLOSURE

A wire feeder is disclosed for a portable welding system. In one approach, the wire feeder can include a housing having a wire inlet region and a wire outlet region. A tensioning assembly can be coupled to the housing, the tensioning assembly comprising a pivotable tension arm and a pivotable tension knob assembly. The pivotable tension arm may have a pivot axis oriented perpendicular to the direction of a wire fed through the wire feeder. The pivotable tension knob assembly may have a pivot axis oriented parallel to the direction of the wire fed through the wire feeder. A roller assembly may include a drive roller rotatably coupled to the pivotable tension arm, and a feed roller coupled to the housing. The feed roller can be positionable opposite the drive roller to receive a welding wire therebetween and to move the welding wire from the wire inlet region to the wire outlet region. A gear assembly may be coupled to the feed roller, the gear assembly for coupling to a drive motor to transmit rotational motion of the motor to the feed roller. Thus arranged, when the tension knob assembly is in an open position the tension knob assembly is pivoted about its pivot axis to separate the drive roller from the feed roller, and when the tension knob assembly is in a closed position the tension knob assembly is pivoted about its pivot axis to position the drive roller closely adjacent to the feed roller.

In another approach, a wire feeder includes a housing having a wire inlet region and a wire outlet region, and a tensioning assembly coupled to the housing. The tensioning assembly may include a pivotable tension arm and a pivotable tension knob assembly, the pivotable tension arm having a pivot axis oriented substantially perpendicular to a direction of a wire fed through the wire feeder. The pivotable tensioning assembly may have a pivot axis oriented substantially parallel to the direction of the wire fed through the wire feeder. The wire feeder further includes a roller assembly comprising a drive roller rotatably coupled to the pivotable tension arm, and a feed roller coupled to the housing, the feed roller positionable opposite the drive roller to receive the wire therebetween and to move the wire from the wire inlet region to the wire outlet region, wherein the tension knob assembly is pivotable about its pivot axis to actuate the drive roller and the feed roller relative to one another. The wire feeder may further include a gear assembly coupled to the feed roller, the gear assembly configured to transmit rotational motion of a drive motor to the feed roller.

In another approach, a multifunction wire feeder includes a tensioning assembly coupled to a housing, the tensioning assembly comprising a pivotable tension arm and a pivotable tension knob assembly. The pivotable tension arm may have a pivot axis oriented substantially perpendicular to a direction of a wire fed through the wire feeder, while the pivotable tensioning assembly may have a pivot axis oriented substantially parallel to the direction of the wire fed through the wire feeder. The multifunction wire feeder may further include a roller assembly including a drive roller rotatably coupled to the pivotable tension arm, and a feed roller coupled to the housing, the feed roller positionable opposite the drive roller to receive the wire therebetween and to move the wire from a wire inlet region to a wire outlet region, wherein the tension knob assembly is pivotable about its pivot axis to actuate the drive roller and the feed roller relative to one another. The multifunction wire feeder may further include a gear assembly coupled to the feed roller, the gear assembly configured to transmit rotational motion of a drive motor to the feed roller.

BRIEF DESCRIPTION OF THE DRAWINGS

By way of example, a specific embodiment of the disclosed device will now be described, with reference to the accompanying drawings, in which:

FIG. 18 is an isometric view of the wire feeder of FIG. 1 illustrating an exemplary wire guiding feature;

FIG. 21 is a cross-section view of the housing portion of the wire feeder of FIG. 1 taken alone line 21-21 of FIG. 1;

FIG. 22 is a side view of an exemplary torch connector for use with the wire feeder of FIG. 1.

Figure 1:
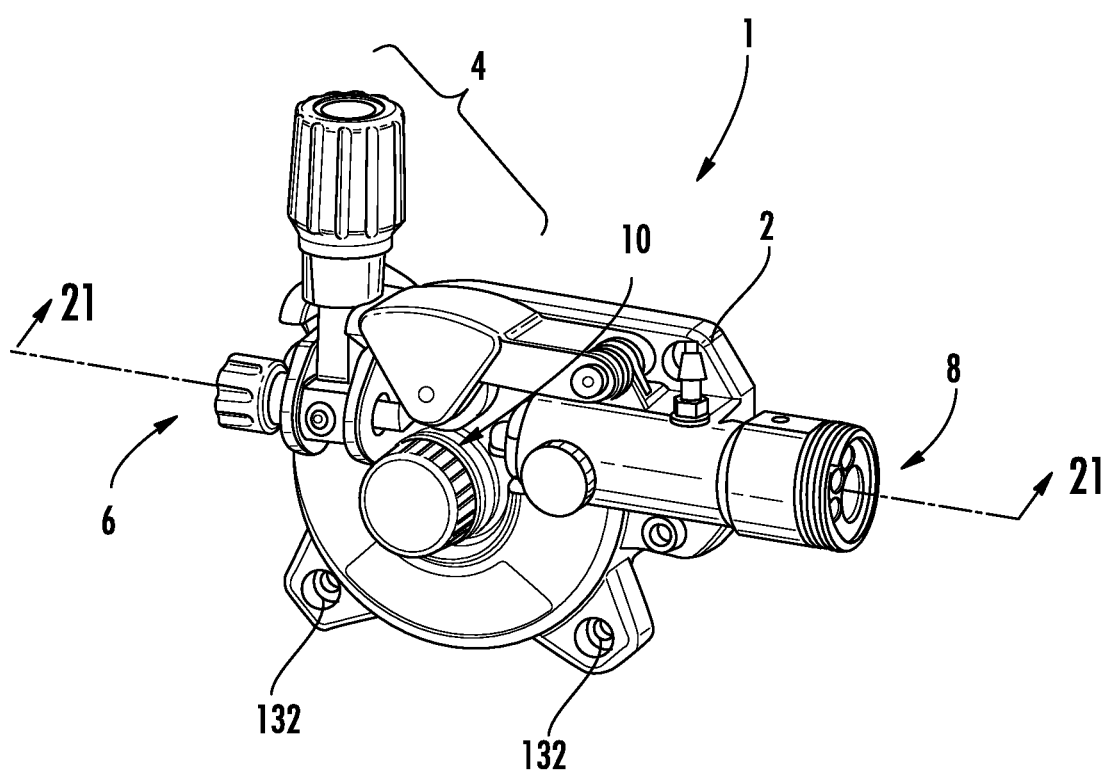
FIG. 1 is an isometric view of an exemplary wire feeder according to the disclosure.
Figure 2:
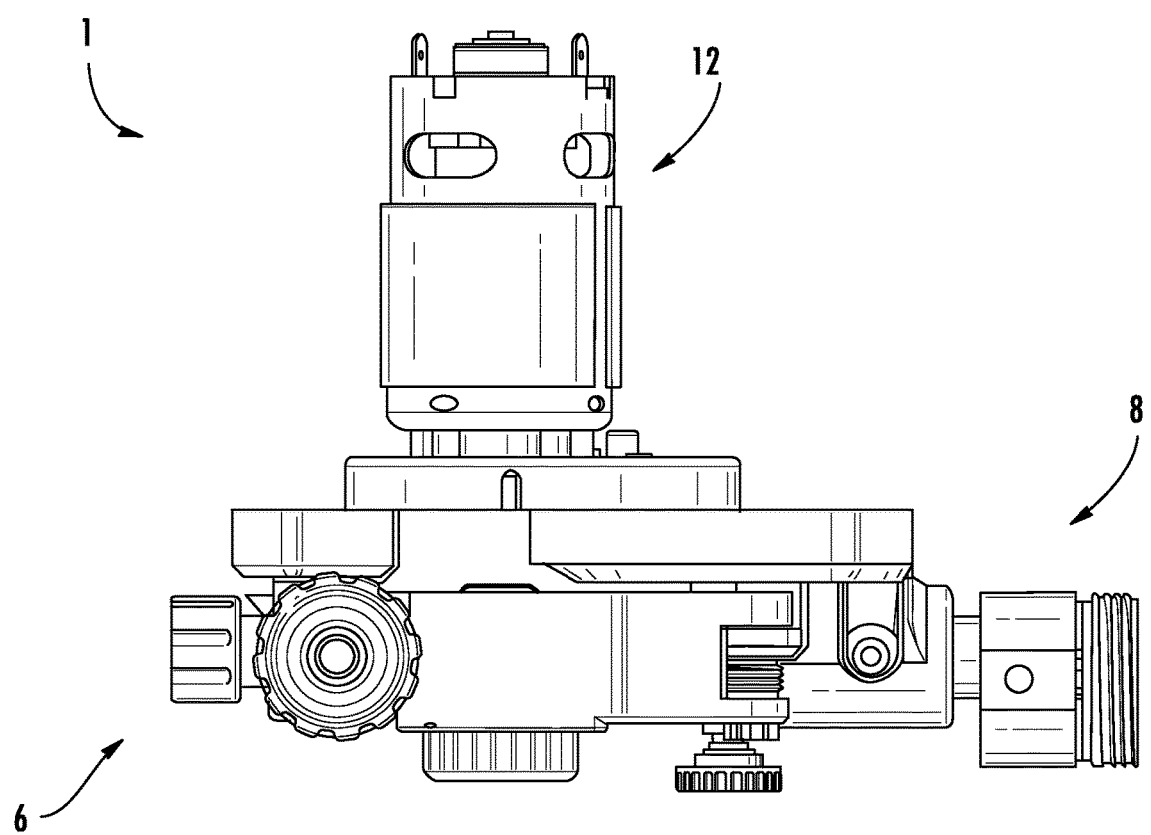
FIG. 2 is a top view of the wire feeder of FIG. 1.
Figure 3:
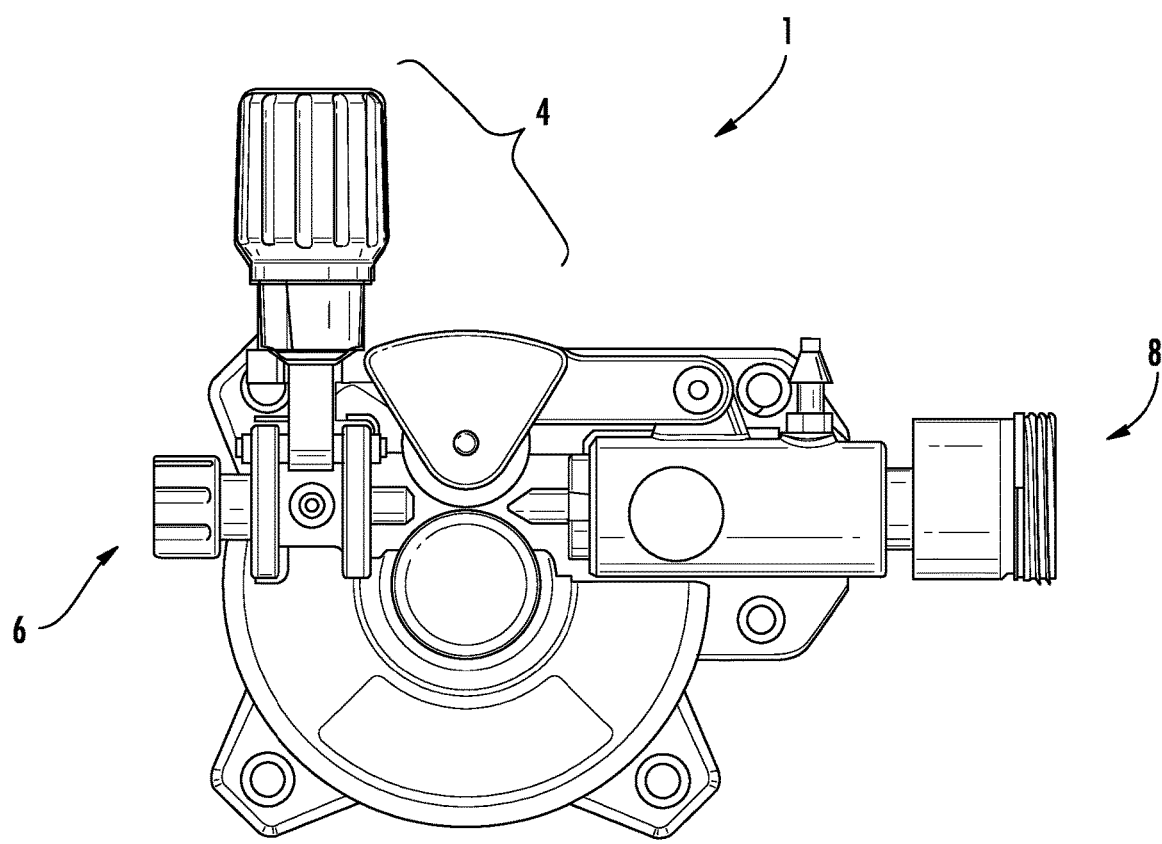
FIG. 3 is a front side view of the wire feeder of FIG. 1.
Figure 4:
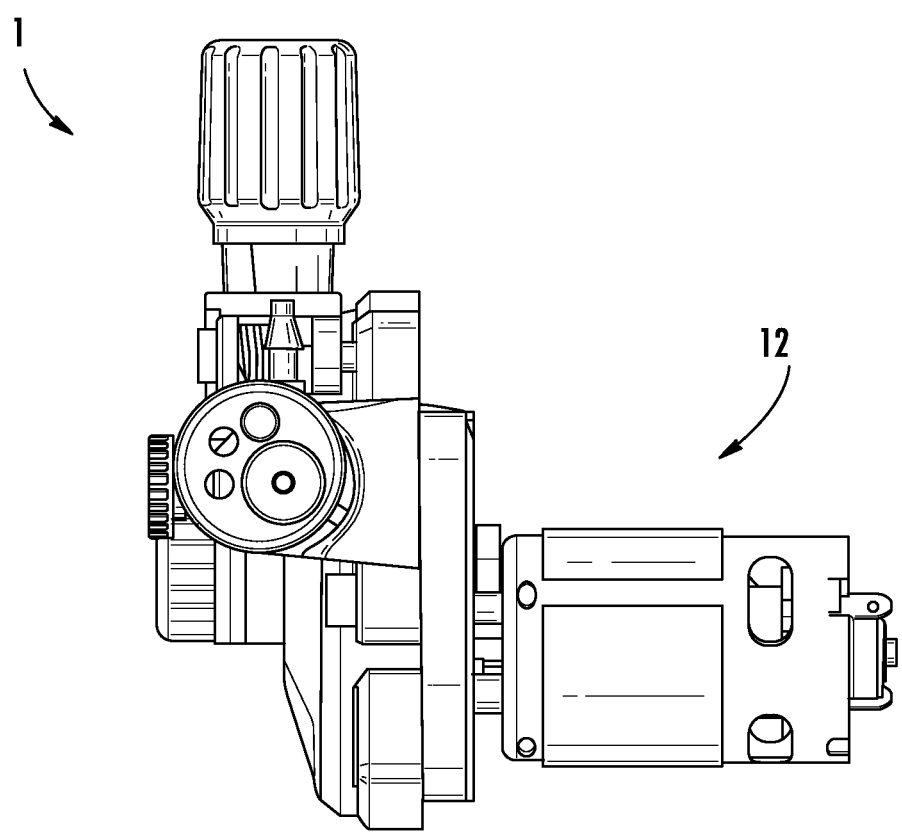
FIG. 4 is a first end view of the wire feeder of FIG. 1.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

An improved welding system casing is disclosed for use with manual welding torches. The casing is an improvement over previous designs in that it is rugged, is easily transportable between work locations, and can be easily repaired should it become damaged in use.

For the sake of convenience and clarity, terms such as "top," "bottom," "upper," "lower," "vertical," "horizontal," "lateral," and "longitudinal" will be used herein to describe the relative placement and orientation of these components and their constituent parts, with respect to the geometry and orientation of a component of a semiconductor manufacturing device as appearing in the figures. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

Referring now to FIGS. 1-7, an exemplary wire feeder 1 includes a housing 2, a tensioning assembly 4, a wire inlet region 6, a wire outlet region 8, and a roller assembly 10. A motor 12 is coupled to the roller assembly 10 to drive the roller assembly at a desired rate of speed. Wire may be pulled from a spool (not shown) via the wire feeder 1. The wire feeder 1 pulls the wire in through the wire inlet region 6, contacts with wire using the roller assembly 10, and pushes the wire out through the wire outlet region 8 to a welding gun (not shown).

The housing 2 may be a cast arrangement made from any of a variety of appropriate materials, including metals, polymers and the like. In one non-limiting exemplary embodiment, the housing 2 may be made from cast aluminum. The remaining elements of the wire feeder 1 may be mounted to different portions of the housing 2, and thus the housing may be provided with a variety of individual mounting features, as will be described in greater detail in relation to the individual components of the wire feeder 1.

As will be appreciated, the wire feeder 1 may draw wire "W" (FIG. 8) in through the wire inlet region 6 from a wire spool by rotational contact with one or more rollers of the roller assembly 10. The rollers may push the wire out the wire outlet region 8 for use by the welding torch. In order to ensure that a desired wire feed speed is maintained during operation, it is important to ensure that sufficient friction exists between the wire and the rollers to minimize the chance for slippage. It is also important to ensure that not too much friction exists between the wire and the one or more rollers of the roller assembly 10. This balance is complicated further where the wire feeder 1 is configured for use with more than one wire material and/or wire size. To address this, the tensioning assembly 4 can enable a user to manually adjust the tensioning force on a particular wire being used with the wire feeder 1.

Figure 8:
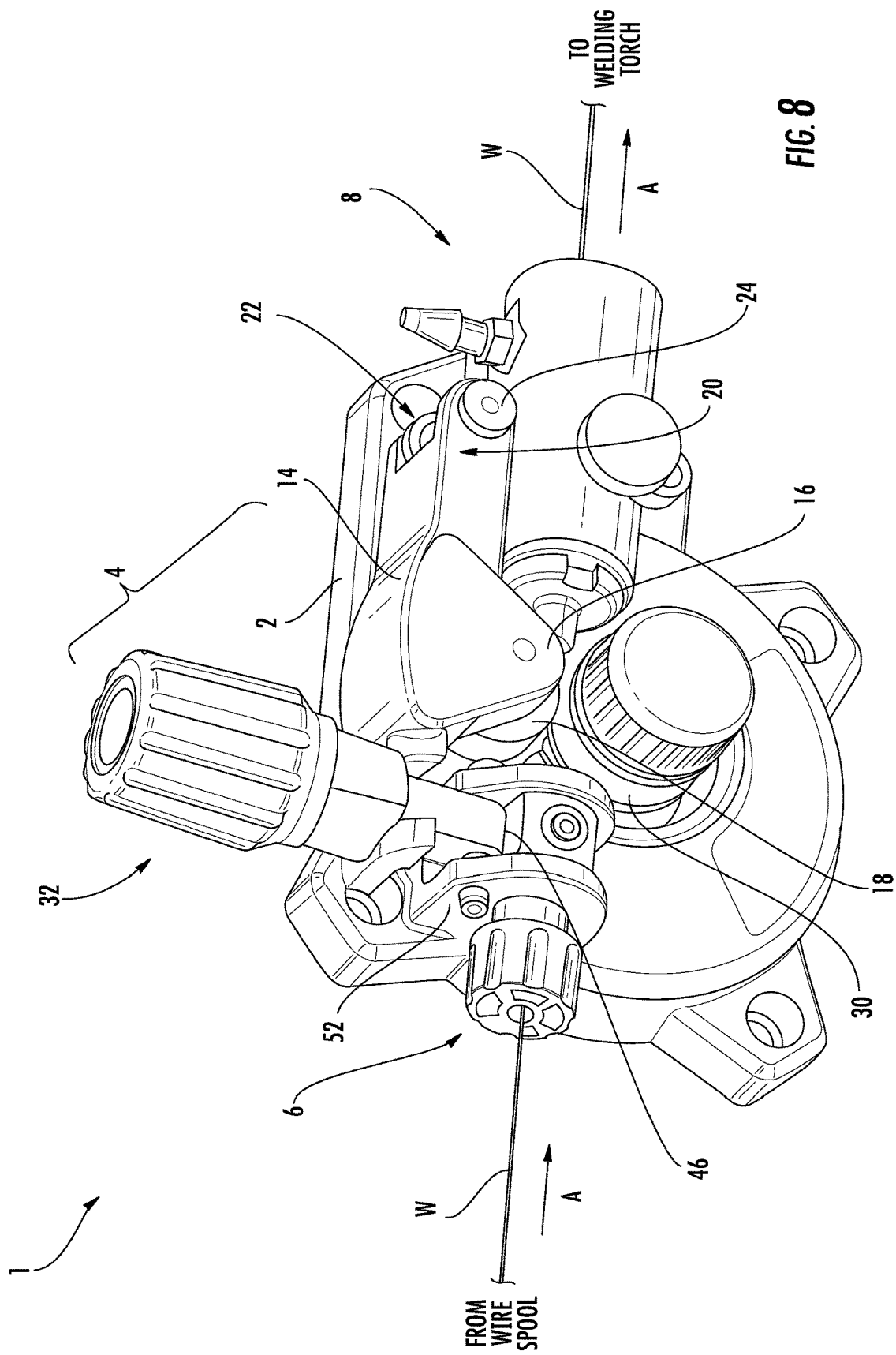
FIG. 8 is an isometric view of the wire feeder of FIG. 1, showing an exemplary tensioning arrangement.

In general, as demonstrated in FIG. 8, the tensioning assembly 4 includes a tensioning arm 14 having a first end 16 fitted with a rotatable drive roller 18 and a second end 20 pivotably coupled to the housing 2 via a pivot connection 22. The tensioning arm 14 can be rotated between an open configuration and a closed configuration (shown in FIG. 8) by rotating the tensioning arm about the pivot connection 22. In one embodiment, the pivot connection 22 comprises a shoulder screw 24 disposed within respective openings (e.g., opening 26 shown in FIG. 9) in the second end 20 of the tensioning arm 14 and the housing 2. When in the open configuration, the drive roller 18 is separated from an opposing feed roller 30 so that a wire "W" can be fed through the wire feeder 1 in the direction identified by arrow "A." In some embodiments the tensioning arm 14 is biased toward the open configuration by a torsion spring coupled to the pivot connection 22. Once the wire "W" is appropriately positioned within the wire feeder 1, the tensioning arm 14 can then be pivoted about the pivot connection 22 to assume the closed configuration, whereupon the wire "W" is squeezed between the drive roller 18 and the feed roller 30.

Figure 10:
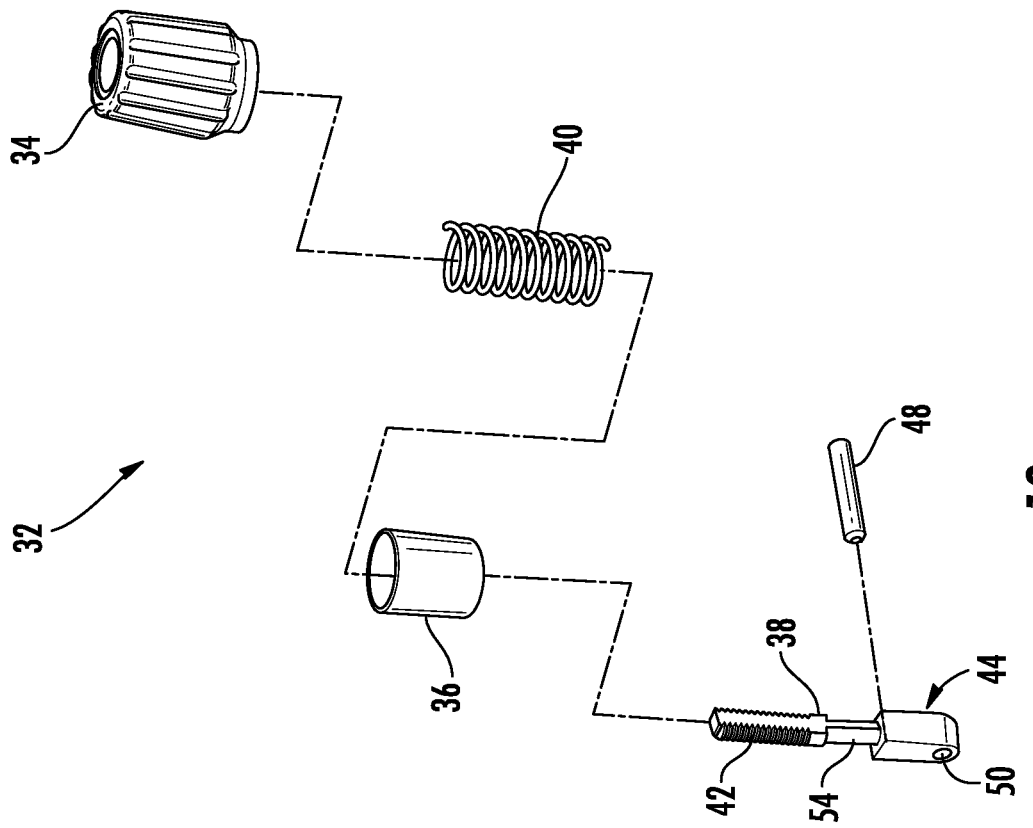
FIG. 10 is an exploded view of an exemplary tensioning knob assembly of wire feeder of FIG. 1.

To maintain a desired downforce on the wire "W" via the drive roller 18, the tensioning assembly 4 may further include a tension knob assembly 32 that is configured to lock the tensioning arm 14 in a desired closed configuration and to apply a desired downward force on the tensioning arm 14. As shown in FIG. 10, the tension knob assembly 32 may include a tension adjustment knob 34, a tension adjustment base 36, a tension adjustment bolt 38 and a tension spring 40. The tension adjustment knob 34 may extensibly receive the tension adjustment base 36 therein. The tension spring 40 may be positioned between the tension adjustment knob 34 and the tension adjustment base 36 to bias the parts away from each other. The tension adjustment base 36, tension spring 40, and tensional adjustment knob 36 may receive a first threaded end 42 of the tension adjustment bolt 38 therein. The first threaded end 42 of the tension adjustment bolt 38 may threadably engage the tension adjustment knob 34 so that as the tension adjustment knob 34 is rotated in a first direction as the tension adjustment knob 34 is drawn toward the tension adjustment base 36, thus compressing the tension adjustment spring 40.

As shown in FIGS. 8 and 10, a second end 44 of the tension adjustment bolt 38 may be pivotably coupled to the housing 2 via a tensioning pivot connection 46 positioned adjacent the wire inlet region 6 of the wire feeder 1. In one embodiment, the tensioning pivot connection 46 comprises a spring roll pin 48 disposed within respective openings 50, 52 in the second end 44 of the tensioning knob assembly 32 and the housing 2, respectively.

Figure 9:
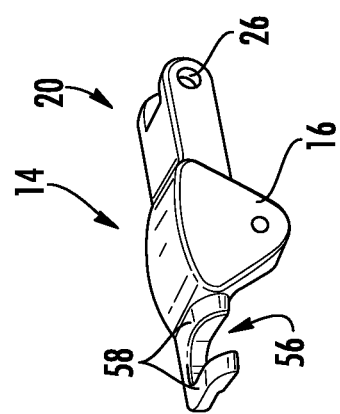
FIG. 9 is an isometric view of an exemplary tensioning arm of the wire feeder of FIG. 1.

As shown in FIGS. 8-10, the tensioning knob assembly 32 can be rotated between an open configuration and a closed configuration (shown in FIG. 8) by rotating the tensioning arm 14 about the tensioning pivot connection 46. When in the open configuration, the tensioning knob assembly 32 is separated from the tensioning arm 14 so that the tensioning arm 14 can be rotated into the closed configuration. Once the tensioning arm 14 is in the closed position, the tensioning knob assembly 32 can then be pivoted about the tensioning pivot connection 46 to assume the closed configuration, whereupon a body portion 54 of the tension adjustment bolt 38 is received within a yoke portion 56 of the tensioning arm 14. When the tension adjustment bolt 38 is received within the yoke portion 56, the tension adjustment base 36 engages a top surface 58 of the tensioning arm 14 so that the biasing force of the tension spring 40 is applied to the top surface 58. This biasing force is, in turn, directly applied to the drive roller 18 to maintain a desired downward force on the wire "W" disposed between the drive roller 18 and the feed roller 30. Adjustment of the downward force can be made by rotating the tension adjustment knob 34. By rotating the tension adjustment knob 34 in a first direction, the threaded engagement between the tension adjustment knob 34 and the tension adjustment bolt 38 causes the tension adjustment knob 34 to move away from the tension adjustment base 36, thus reducing compression of the tension spring 40 and reducing downward force on the tension arm 14. Rotating the tension adjustment knob 34 in a second direction opposite the first direction causes the tension adjustment knob 34 to move closer to the tension adjustment base 36, thus increasing compression of the tension spring 40 and increasing downward force on the tension arm 14.

In the illustrated embodiment, the spring roll pin 48 disposed within respective openings 50, 52 in the second end 44 of the tension adjustment bolt 38 and the housing 2 has a lengthwise axis that is parallel to the axis of the wire "W" travelling through the wire feeder 1. This orientation is advantageous because it enables the tension knob assembly 32 to be rotated away from a surface to which the wire feeder 1 is attached. In one non-limiting exemplary embodiment, the wire feeder 1 may be attached to a center divider (not shown) of a portable welding device. Prior wire feeder designs have included tension knobs that rotate about an axis that is perpendicular to the axis of the wire being fed through the wire feeder. Such an arrangement can be disadvantageous because in rotating, such tension knobs can interfere with other equipment located within the portable welding device. With the disclosed configuration, the tension knob assembly 32 rotates outward, away from the center divider, and thus it is both easier to manipulate and less likely to interfere with other elements of the portable welding device.

Figure 11:
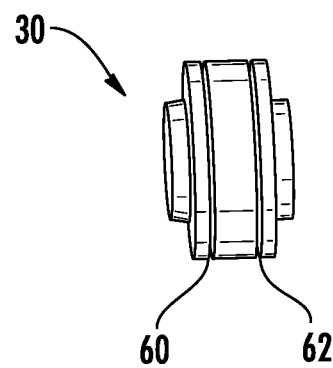
FIG. 11 is an end view of an exemplary feed roller of wire feeder of FIG. 1.
Figure 12:
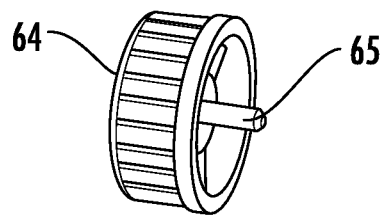
FIG. 12 is an isometric view of an exemplary roller knob of wire feeder of FIG. 1.

Referring now to FIGS. 11-15, the drive assembly may include a reversible feed roller 30 that can be configured to selectively accept at least two different wire sizes. As can be seen in FIG. 11, the feed roller 30 may have first and second circumferential grooves 60, 62, each having a desired depth and width to accept a welding wire having a particular diameter. The desired groove 60, 62 can be selected by simply flipping the orientation of the feed roller 30 on the associated drive shaft (not shown). A knob 64 (FIG. 12) having a threaded body portion 65 can threadably connect to an inner threaded portion of the drive shaft to lock the feed roller 30 to the drive shaft in the selected orientation.

Figure 13:
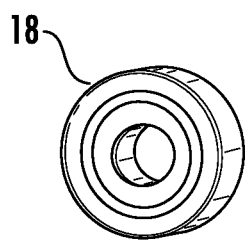
FIG. 13 is an isometric view of an exemplary drive roller of wire feeder of FIG. 1.
Figure 14:
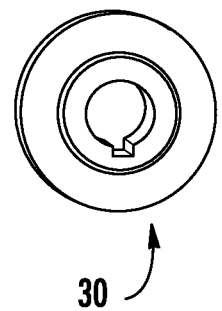
FIGS. 14 and 15 are exemplary first and second isometric view of the feed roller of wire feeder of FIG. 1.
Figure 15:
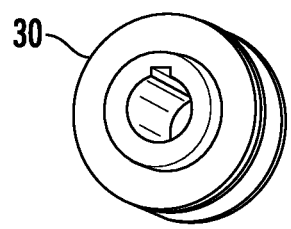

An exemplary wire drive roller 18 is shown in FIG. 13 and, as shown, it may be provided without grooves. An exemplary feed roller 30 is shown in FIGS. 14 and 15, in which a first side of the feed roller 30 corresponds to a groove of about 0.024 inches (0.6 mm), while a second side of the feed roller 30 corresponds to a groove of about 0.030 inches (0.8 mm). In use, if the user intents to use 0.024-inch wire, the feed roller 30 would be oriented so that the associated label is pointing outward. The knob 64 may then be used to lock the feed roller in place. By contrast, if the user intends to use 0.030-inch wire, the feed roller 30 would be oriented so that the associated label is pointing outward. The knob 64 may then be used to lock the feed roller in place. It will be appreciated that the aforementioned sizes and number of grooves are merely exemplary, and others sizes and number of grooves may be used.

Figure 16:
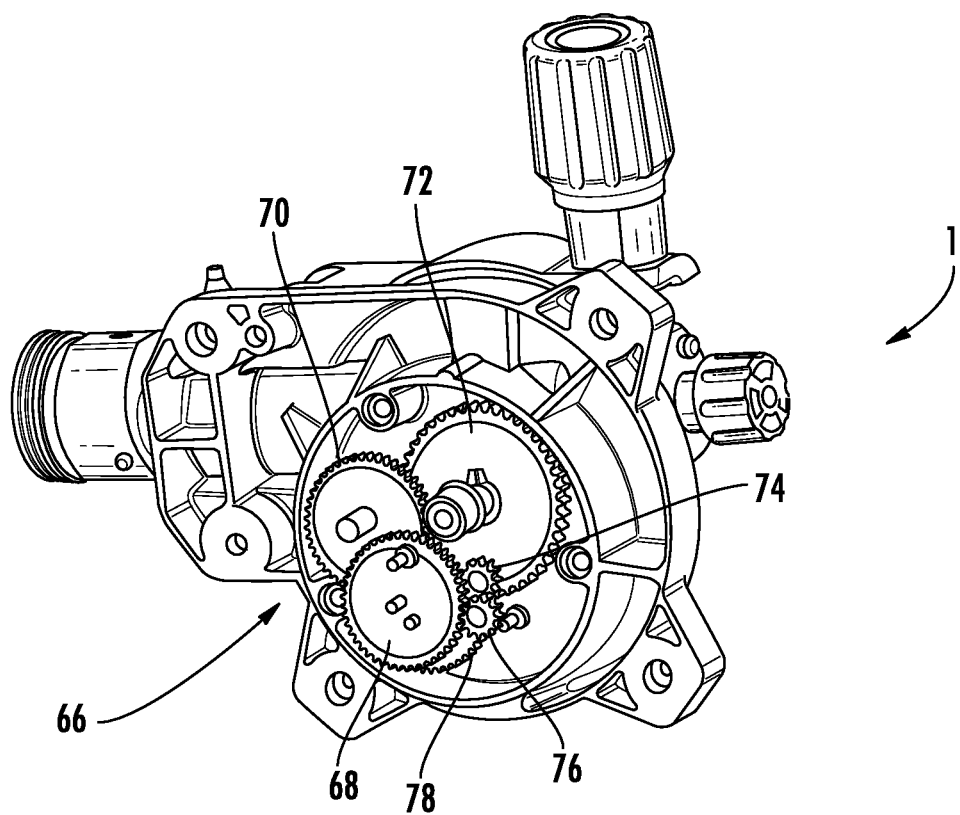
FIG. 16 is a reverse isometric view of the of wire feeder of FIG. 1 illustrating an exemplary drive gearing arrangement.
Figure 17:
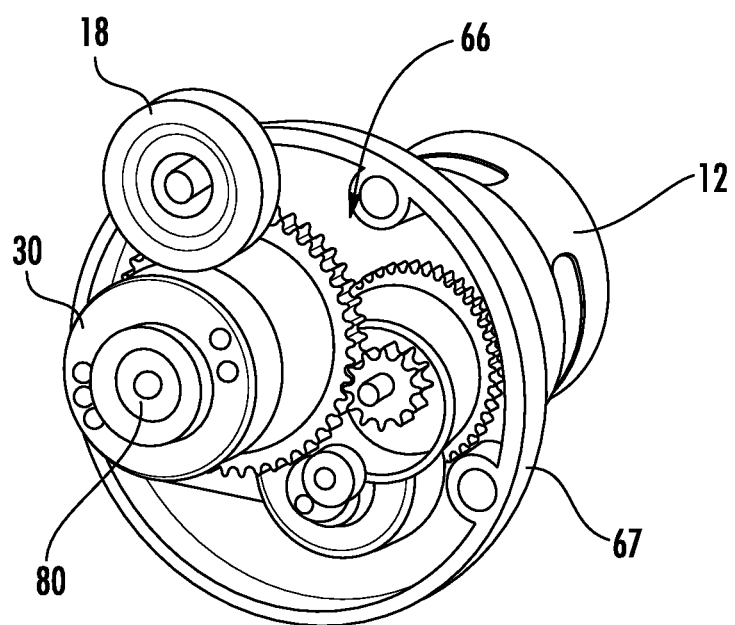
FIG. 17 is a partial isometric view of the wire feeder of FIG. 1 illustrating an exemplary drive gearing arrangement coupled to a feed roller.

Referring now to FIGS. 16 and 17, an exemplary gearing arrangement 66 is shown for the wire feeder 1. The gearing arrangement 66 is partially housed in a gear housing 67 and partially housed in a portion of the housing 2. The gear housing 67 encases a plurality of intermeshing gears 68, 70, 72, 74, 76, 78, which may include one or more driven gears, one or more compound gears, arranged to provide a desired output rotational speed to the feed roller 30 based on a particular speed of the motor 12. The feed roller 30 is engaged with, and keyed to, a drive shaft 80 which is coupled to the gearing arrangement 66.

The gear housing 67 and wire feeder housing 2 may be sized so that a variety of gear types, sizes, and combinations can be employed to achieve a desired wire feed speed given a known motor rotational speed. This is an advantage over prior designs which are sized to accept a single gearing arrangement.

Figure 20:
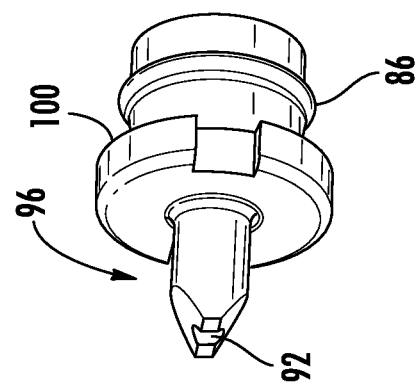
FIGS. 19 and 20 are isometric views of an inlet wire guide and a torch side wire guide for use with the wire feeder of FIG. 1.
Figure 19:
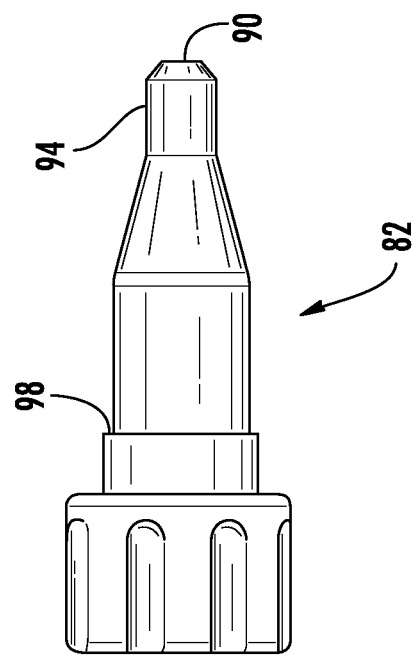

FIGS. 18-20 show an exemplary wire guiding arrangement for the wire feeder 1. An inlet wire guide 82 may be disposed within a cylindrical opening 84 formed in the housing 2 adjacent the wire inlet region 6. A torch side wire guide 86 may be disposed within a cylindrical opening 88 formed in the housing 2 adjacent to the wire outlet region 8. The inlet and torch side wire guides 82, 86 have respective axial openings 90, 92 oriented coaxially with the wire "W" when the guides are disposed in the openings 84, 88 of the housing 2. As such, the inlet wire guide 82 can serve to guide the wire "W" to a desired location between the drive roller 18 and the feed roller 30, while the torch side wire guide 86 can serve to guide the wire away from the drive and feed rollers, out to the torch. It will be appreciated that providing these guides can minimize the chance that the wire may bunch or tangle. To minimize the amount of distance between the guides 82, 86 and the rollers 18, 30, each guide 82, 86 may respectively include a tapered nose portion 94, 96. The tapered nose portion 94 of the inlet wire guide 82 is shown best in FIG. 19, while the tapered nose portion 96 of the torch side wire guide 86 is shown in FIG. 20. In non-limiting embodiments, the tapered nose portion 94 of the inlet wire guide is generally round, while the tapered nose portion 96 of the torch side wire guide 86 is chisel shaped to enable the tapered nose portion 96 to be positioned as close to the feed and drive rollers 18, 30 as possible.

The inlet wire guide 82 and the torch side wire guide 86 may have respective enlarged shoulder regions 98, 100, that are configured to abut respective surfaces of the housing 2 adjacent the respective cylindrical openings 84, 88 formed in the housing 2. As will be appreciated, these shoulder regions 98, 100 prevent the respective wire guides 82, 86 from moving in the direction of the wire "W" (indicated by arrow "A" in FIG. 18) during operation. In some non-limiting embodiments, the inlet wire guide 82 and torch side wire guide 86 may be formed of a suitable polymer material.

Referring now to FIGS. 21 and 22, the wire feeder 1 may include features that enable simple plug compatibility with a torch connector 102. The housing 2 of the wire feeder 2 may have a cylindrical opening configured to receive a torch connector 102 therein. As can be seen, the housing 2 includes a cylindrical opening 101 formed therein having a first end 103 adjacent to the wire outlet region 8 of the wire feeder 1. The cylindrical opening 101 may be sized to accept a projecting cylindrical portion 104 of the torch connector 102 therein. In use, the projecting cylindrical portion 104 may be pressed into the cylindrical opening 101 until a side surface 105 of the torch connector 102 engages a side surface of the housing 106. At that point, the distal end 108 of the projecting cylindrical portion 104 may be positioned so that a recess 109 in the distal end 108 aligns generally with the projecting end (not shown) of a thumb screw 110 (FIG. 18). Turning the thumb screw 110 may engage the projecting end of the thumb screw 110 with the recess 109, locking the torch connector 102 in place. In this position, a gas inlet portion 112 of the torch connector 102 may be positioned directly adjacent to a gas inlet 114 formed in the housing 2. The gas inlet portion 112 of the torch connector 102 may include a plurality of radially disposed openings 116, with a pair of o-rings 118, 120 (also referred to as seals) disposed on either side thereof. A gas supply nipple 122 (FIG. 18) may be disposed in the gas inlet 114. The gas supply nipple 122 may be connected to a suitable source of shielding gas. Thus arranged, shielding gas can be provided by the wire feeder 1 to the torch via the torch connector 102 without the need for an adapter.

Figure 24:
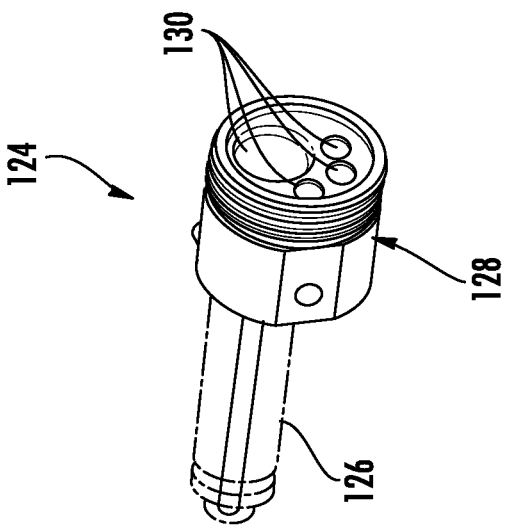
FIGS. 23 and 24 are first and second isometric views of a torch adaptor for use with the wire feeder of FIG. 1.
Figure 23:
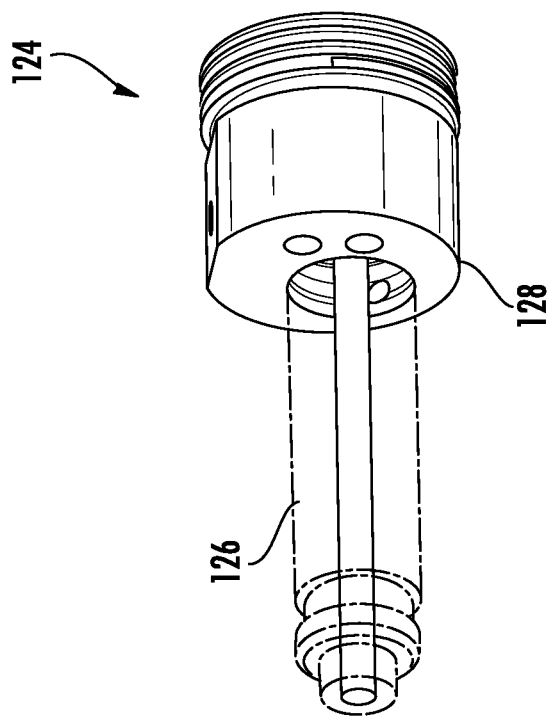

In some embodiments it may be desirable to provide an adapter, however, such as a "Euro Adapter," to enable users having "Euro" connectors to couple such torches to the disclosed wire feeder 1. Thus, as shown in FIGS. 23 and 24, an adapter 124 may have a first portion 126 receivable within the cylindrical opening 101 of the housing 2, and a second portion 128 having connection ports 130 suitable for receiving a Euro connection. It will be appreciated that an adapter having a Euro connection is merely exemplary, and that an appropriate adapter can include other connection types, as desired.

Figure 5:
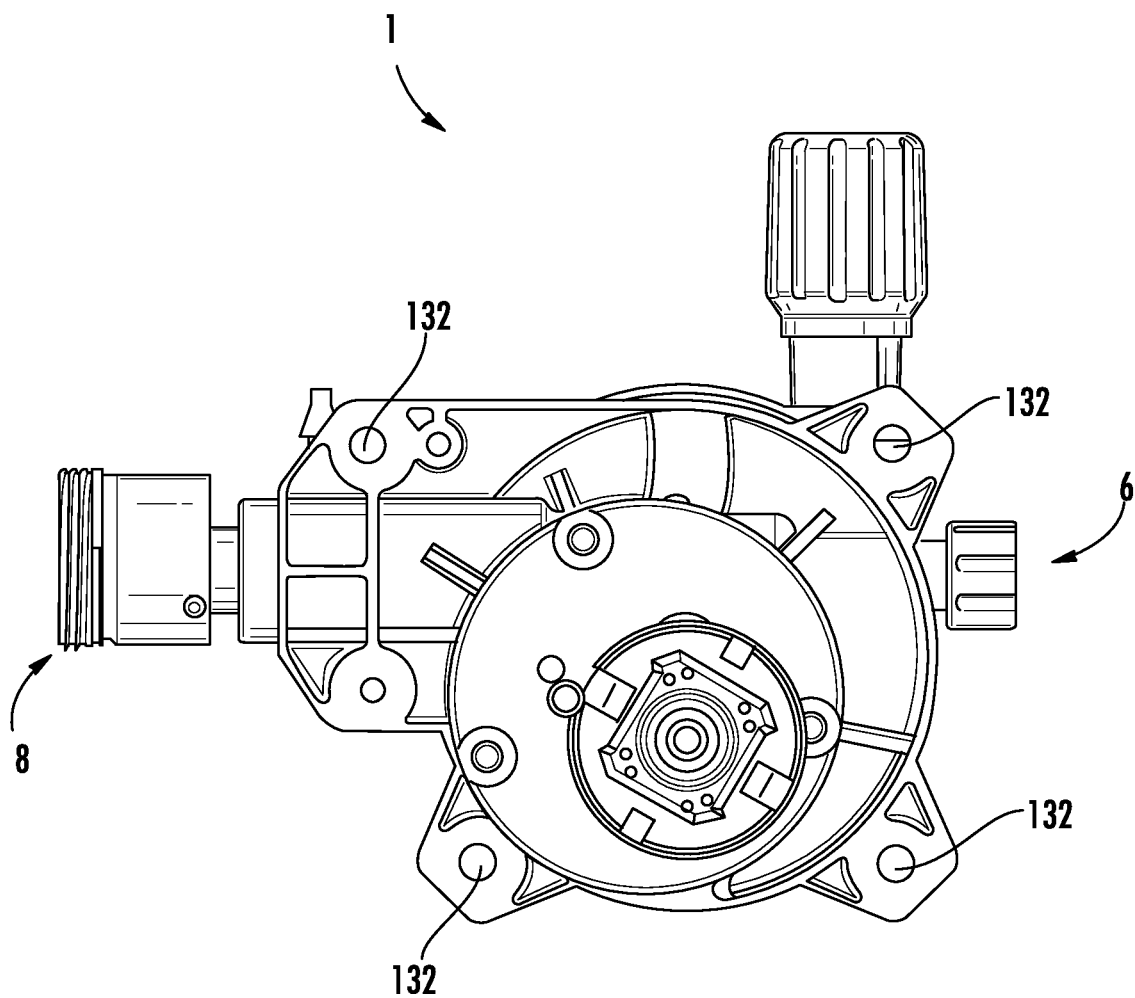
FIG. 5 is a rear side view of the wire feeder of FIG. 1.
Figure 6:
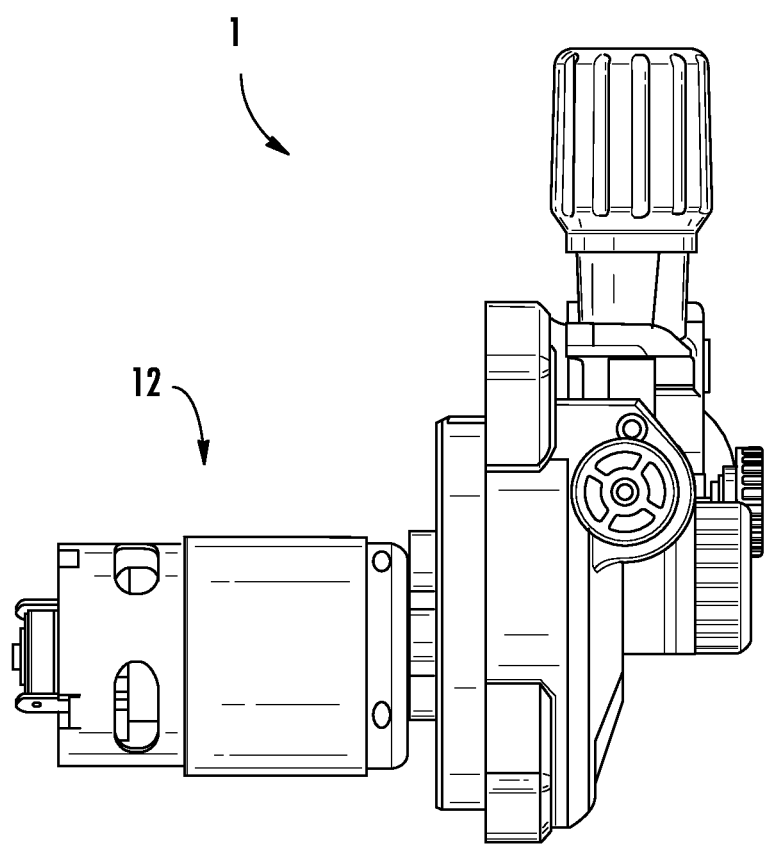
FIG. 6 is a second end view of the wire feeder of FIG. 1.
Figure 7:
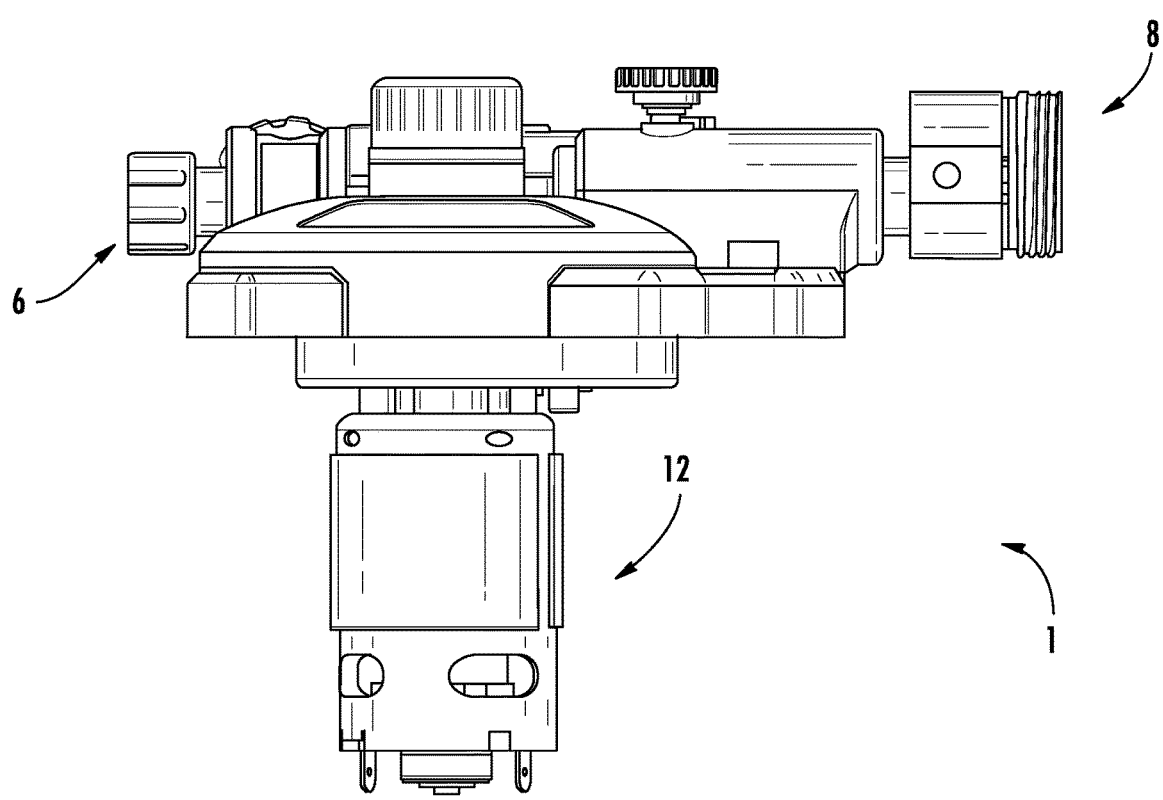
FIG. 7 is a bottom view of the wire feeder of FIG. 1.

As may be best seen in FIGS. 1 and 5, the disclosed wire feeder 1 may have a plurality of features configured to enable the wire feeder to be fixed to a surface of an associated portable welding device. For example, in the illustrated embodiment, the housing 2 includes a plurality of fastener openings 132 sized to receive suitable fasteners, such as screws, bolts or the like, to fix the wire feeder in place within the welding device.

Based on the foregoing information, it will be readily understood by those persons skilled in the art that the invention is susceptible of broad utility and application. Many embodiments and adaptations of the invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the invention or otherwise exclude any such other embodiments, adaptations, variations, modifications or equivalent arrangements; the invention being limited only by the claims appended hereto and the equivalents thereof. Although specific terms are employed herein, they are used in a generic and descriptive sense only and not for the purpose of limitation.

What is claimed is:

1. A wire feeder for a portable welding system, comprising: a housing having a wire inlet region and a wire outlet region; a tensioning assembly coupled to the housing, the tensioning assembly comprising: a pivotable tension arm having a first pivot axis oriented perpendicular to a wire feeding direction of the wire feeder; and a pivotable tension knob assembly having a second pivot axis oriented parallel to the wire feeding direction, wherein the pivotable tension arm is free to rotate about the first pivot axis when the pivotable tension knob assembly is rotated from a closed position to an open position by rotating about the second pivot axis; a roller assembly comprising a drive roller rotatably coupled to the pivotable tension arm; and a feed roller coupled to a first side of the housing, the feed roller positionable opposite the drive roller to receive a first wire or a second wire therebetween and to feed the first wire or the second wire from the wire inlet region to the wire outlet region, wherein the second wire has a different diameter than the first wire, and the pivotable tension knob assembly is adjustable to apply a downward force to the drive roller via the pivotable tension arm so that the drive roller maintains a downward force on the first wire or the second wire when the feed roller and the drive roller feed the first wire or the second wire from the wire inlet region to the wire outlet region; a gear housing coupled to a second side of the housing that is opposite the first side of the housing; and a gear assembly that is housed in the gear housing and that is directly coupled to a drive motor and the feed roller so that the gear assembly transmits rotational motion of the drive motor to the feed roller, wherein the gear housing is sized so that the gear assembly is formable from multiple different gearing arrangements to achieve a desired wire feed speed when feeding the first wire or the second wire.

2. The wire feeder of claim 1, wherein the wire outlet region includes a cylindrical opening configured to receive a torch connector having a plurality of gas inlets configured to correspond to a gas inlet of the wire outlet region, the plurality of gas inlets sealed via first and second seals disposed on opposite sides of the plurality of gas inlets.

3. The wire feeder of claim 1, wherein the pivotable tension knob assembly comprises:
a tension adjustment bolt receivable within a yoke portion of the pivotable tension arm, the tension adjustment bolt being coupled to a tension adjustment knob of the pivotable tension knob assembly and a tension adjustment base of the pivotable tension knob assembly, and the tension adjustment base being coupleable with the yoke portion to move the drive roller toward the feed roller.

4. The wire feeder of claim 3, wherein the tension adjustment bolt is pivotably coupled to the housing via a tensioning pivot connection located adjacent the wire inlet region, and wherein the tensioning pivot connection includes a spring roll pin that is disposed within an opening of the tensioning adjustment bolt and within an opening of the housing.

5. The wire feeder of claim 4, wherein the spring roll pin has a lengthwise axis parallel to the wire feeding direction.

6. The wire feeder of claim 1, wherein the feed roller comprises first and second circumferential grooves, the first circumferential groove corresponding to a first diameter of the first wire, the second circumferential groove corresponding to a second diameter of the second wire.

7. The wire feeder of claim 6, wherein in a first orientation of the feed roller, the first circumferential groove is engageable with the first wire to feed the first wire through the wire feeder, and wherein in a second orientation of the feed roller, the second circumferential groove is engageable with the second wire to feed the second wire through the wire feeder.

8. The wire feeder of claim 1, wherein the feed roller is removably coupled to the housing.

9. A wire feeder, comprising: a housing having a wire inlet region and a wire outlet region; a tensioning assembly coupled to the housing, the tensioning assembly comprising: a pivotable tension arm having a first pivot axis oriented perpendicular to a wire feeding direction; a pivotable tension knob assembly having a second pivot axis oriented parallel to the wire feeding direction; a roller assembly comprising: a drive roller rotatably coupled to the pivotable tension arm; and a feed miller coupled to a first side of the housing, the feed roller positionable opposite the drive roller to receive a first wire or a second wire therebetween and to feed the first wire or the second wire from the wire inlet region to the wire outlet region, wherein the second wire has a different diameter than the first wire, and the pivotable tension knob assembly is adjustable to apply a downward force to the drive roller via the pivotable tension arm so that the drive roller maintains a downward force on the first wire or the second wire when the feed roller and the drive roller feed the first wire or the second wire from the wire inlet region to the wire outlet region; a gear housing coupled to a second side of the housing that is opposite the first side of the housing; and a gear assembly that is housed in the gear housing and that is directly coupled to a drive motor and the feed roller so that the gear assembly transmits rotational motion of the drive motor to the feed roller, wherein the gear housing is sized so that the gear assembly is formable from multiple different gearing arrangements to achieve a desired wire feed speed when feeding the first wire or the second wire.

10. The wire feeder of claim 9, wherein the wire outlet region includes an opening configured to receive a torch connector having a plurality of gas inlets configured to correspond to a gas inlet of the wire outlet region, the plurality of gas inlets sealed via first and second circumferential seals disposed along the torch connector.

11. The wire feeder of claim 9, wherein the pivotable tension knob assembly comprises:
a tension adjustment bolt receivable within a yoke portion of the pivotable tension arm, the tension adjustment bolt being coupled to a tension adjustment knob of the pivotable tension knob assembly and a tension adjustment base of the pivotable tension knob assembly, and the tension adjustment base being coupleable with the yoke portion to move the drive roller toward the feed roller.

12. The wire feeder of claim 11, wherein the tension adjustment bolt is pivotably coupled to the housing via a tensioning pivot connection located adjacent the wire inlet region, wherein the tensioning pivot connection includes a spring roll pin that is disposed within an opening of the tensioning adjustment bolt and within an opening of the housing, and wherein the spring roll pin has a lengthwise axis parallel to the wire feeding direction.

13. The wire feeder of claim 9, wherein the feed roller comprises first and second circumferential grooves, the first circumferential groove corresponding to a first diameter of the first wire, the second circumferential groove corresponding to a second diameter of the second wire.

14. The wire feeder of claim 13, wherein in a first orientation of the feed roller, the first circumferential groove is engageable with the first wire to feed the first wire through the wire feeder, and wherein in a second orientation of the feed roller, the second circumferential groove is engageable with the second wire to feed the second wire through the wire feeder.

15. The wire feeder of claim 9, wherein the feed roller is removably coupled to the housing.

16. A multifunction wire feeder, comprising: a tensioning assembly coupled to a housing, the tensioning assembly comprising: a pivotable tension arm having a first pivot axis oriented perpendicular to a wire feeding direction; and a pivotable tension knob assembly having a second pivot axis oriented parallel to the wire feeding direction a roller assembly comprising: a drive roller rotatably coupled to the pivotable tension arm; and a feed roller coupled to a first side of the housing, the feed roller positionable opposite the drive roller to receive a first wire or a second wire therebetween and to feed the first wire or the second wire from a wire inlet region to a wire outlet region, wherein the second wire has a different diameter than the first wire, and the pivotable tension knob assembly is adjustable to apply a downward force to the drive roller via the pivotable tension arm so that the drive roller maintains a downward force on the first wire or the second wire when the feed roller and the drive roller feed the first wire or the second wire from the wire inlet region to the wire outlet region; a gear housing coupled to a second side of the housing that is opposite the first side of the housing; and a gear assembly that is housed in the gear housing and that is directly coupled to a drive motor and the feed roller so that the gear assembly transmits rotational motion of the drive motor to the feed roller, wherein the gear housing is sized so that the gear assembly is formable from multiple different gearing arrangements to achieve a desired wire feed speed when feeding the first wire or the second wire.

17. The multifunction wire feeder of claim 16, wherein the pivotable tension knob assembly comprises:
a tension adjustment bolt receivable within a yoke portion of the pivotable tension arm, the tension adjustment bolt being coupled to a tension adjustment knob of the pivotable tension knob assembly and a tension adjustment base of the pivotable tension knob assembly, and the tension adjustment base being coupleable with the yoke portion to move the drive roller toward the feed roller.

18. The multifunction wire feeder of claim 17, wherein the tension adjustment bolt is pivotably coupled to the housing via a tensioning pivot connection located adjacent the wire inlet region, wherein the tensioning pivot connection includes a spring roll pin that is disposed within an opening of the tensioning adjustment bolt and within an opening of the housing, and wherein the spring roll pin has a lengthwise axis parallel to the wire feeding direction.

* * * * *